US008763991B2

(12) United States Patent  (10) Patent No.: US 8,763,991 B2
Chen  (45) Date of Patent: Jul. 1, 2014

(54) LIFTABLE PULLER DEVICE

(76) Inventor: Yu-Lin Chen, Taichung (TW)

( * ) Notice: Subject to any disclaimer, the term of this patent is extended or adjusted under 35 U.S.C. 154(b) by 392 days.

(21) Appl. No.: 13/331,029

(22) Filed: Dec. 20, 2011

(65) Prior Publication Data

US 2013/0153842 A1  Jun. 20, 2013

(51) Int. Cl.
B23Q 1/00 (2006.01)
(52) U.S. Cl.
USPC .......................... 254/93 R; 254/134; 254/2 R
(58) Field of Classification Search
USPC ....... 254/4 B, 134, 4 R, 8 B, 2 B, 93 R, 10 B; 414/458
See application file for complete search history.

(56) References Cited

U.S. PATENT DOCUMENTS

| 5,484,134 A * | 1/1996 | Francis ........................ 254/2 B |
| 5,954,160 A * | 9/1999 | Wells, Sr. et al. ............. 187/219 |
| 8,313,086 B2 * | 11/2012 | Gray et al. .................... 254/2 B |
| 2008/0224109 A1 * | 9/2008 | Hong ............................ 254/2 C |
| 2010/0127230 A1 * | 5/2010 | Hung .......................... 254/93 R |
| 2013/0153842 A1 * | 6/2013 | Chen .......................... 254/93 R |

* cited by examiner

Primary Examiner — Lee D Wilson
(74) Attorney, Agent, or Firm — Muncy, Geissler, Olds & Lowe, P.C.

(57) ABSTRACT

A liftable puller device includes a holder, a puller assembly located on the holder, a first frame coupled with the holder and a second frame coupled with the puller assembly. The puller assembly is installed on the holder via the first frame and second frame, and includes a plurality of grippers to grip a wheel. The first frame has a first main retaining zone located on the top end thereof, two first sub retaining zones relative to the first main retaining zone and a first auxiliary retaining zone between the first main retaining zone and one first sub retaining zone. By providing the first auxiliary retaining zone, only a small range of movement is needed to complete switch between a two-gripper and a multi-gripper puller device.

12 Claims, 10 Drawing Sheets

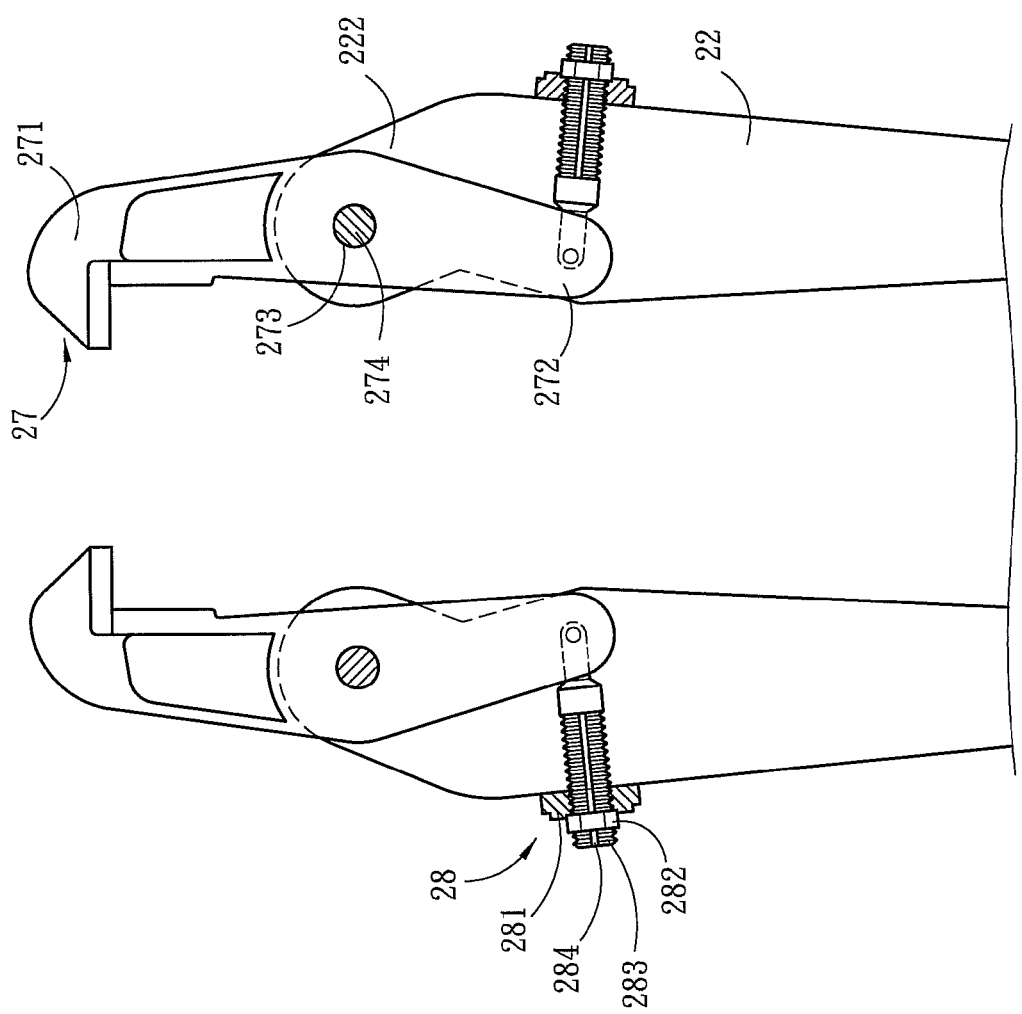

US 8,763,991 B2

LIFTABLE PULLER DEVICE

FIELD OF THE INVENTION

The present invention relates to a puller device and particularly to a liftable puller device.

BACKGROUND OF THE INVENTION

A conventional puller device, such as one disclosed in U.S. publication No. 2008/0224109 includes a pulling assembly hinged with a plurality of hook claws and a movable frame to hold the pulling assembly. Through the movable frame the pulling assembly can be moved up and down in parallel or inclined upwards and downwards to make fine tuned adjustment to facilitate disassembly of a working piece.

The aforesaid pulling assembly includes three sets of opposing grippers to securely grip a targeted wheel to avoid dropping. However, in the event that the puller device operation has to be performed in a smaller space and the three sets of grippers cannot be deployed at the same time, and merely two grippers can be used for pulling, another set of puller device with only two grippers must be deployed. This causes more investments of the equipments. Moreover, the grippers of the aforesaid puller device merely hinged on the body thereof without additional anchoring facilities, safety deficiency becomes a big concern. In addition, its lifting facility does not have extra support. In the event that mechanical disorder takes place or malfunction occurred to the hydraulic equipment, an unpredictable sudden drop could happen. This not only interrupts puller device operation and causes damage of machineries, could even risk operator's safety.

SUMMARY OF THE INVENTION

The primary object of the present invention is to solve the problem of conventional puller devices that cannot switch between three-gripper and two-gripper pulling operations.

Another object of the invention is to overcome the problem of safety deficiency of the conventional techniques.

To achieve the foregoing objects, the present invention provides a liftable puller device that includes a holder, a puller assembly located on the holder, a first frame and a second frame. The holder includes a first holding portion and a second holding portion. The puller assembly includes a main body, a plurality of grippers hinged on the main body, a first hydraulic power system and a second hydraulic power system coaxially coupled on the main body, a plurality of telescopic members hinged on the grippers and first hydraulic power system, and a push rod coupled on the second hydraulic power system. The first hydraulic power system is axially moved to drive the grippers to stretch or retract via the telescopic members. The second hydraulic power system drives the push rod to move axially.

The first frame is coupled with the main body and holder, and includes a plurality of first retaining zones run through by the telescopic members. The first retaining zones include a first main retaining zone, two first sub retaining zones and a first auxiliary retaining zone. The first main retaining zone is located on a top end of the first frame. The first sub retaining zones are relative to and spaced from the first main retaining zone at the same distance. The first auxiliary retaining zone is located between the first main retaining zone and one of the first sub retaining zones. The second frame is connected to the main body and second holding portion, and formed at a diameter greater than that of the first frame. The second frame includes a plurality of second retaining zones run through by the grippers. The second retaining zones include a second main retaining zone, two second sub retaining zones and a second auxiliary retaining zone corresponding to the first retaining zones. In other words, the second main retaining zone is located on a top end of the second frame, the second sub retaining zones are relative to the second main retaining zone, and the second auxiliary retaining zone is located between the second main retaining zone and one of the second sub retaining zones. By installing the three grippers on the first main retaining zone and first sub retaining zones, a three-gripper puller device structure is formed to perform three-gripper wheel pulling operation. In the event that a two-gripper puller device structure is required, only two grippers installing on the first auxiliary retaining zone and the first sub retaining zone corresponding to the first auxiliary retaining zone can meet this purpose.

Compared with the conventional techniques, the invention provides features as follows:

1. Through the first retaining zones and second retaining zones, the grippers can be switched between three-gripper and two-gripper structure as desired. Besides, through the first auxiliary retaining zone located between the first main retaining zone and one of the first sub retaining zones, switching between the three-gripper and two-gripper structure is simpler and can be done quickly.

2. The first and second hydraulic power systems are installed coaxially, hence can save installation space. Moreover, during puller device operation a positive force and reverse force can be applied coaxially to save power of the puller device.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 5A is a schematic view of an embodiment of the invention showing angular adjustment condition-1 of the claw hook.

DETAILED DESCRIPTION OF THE PREFERRED EMBODIMENTS

Figure 1A:
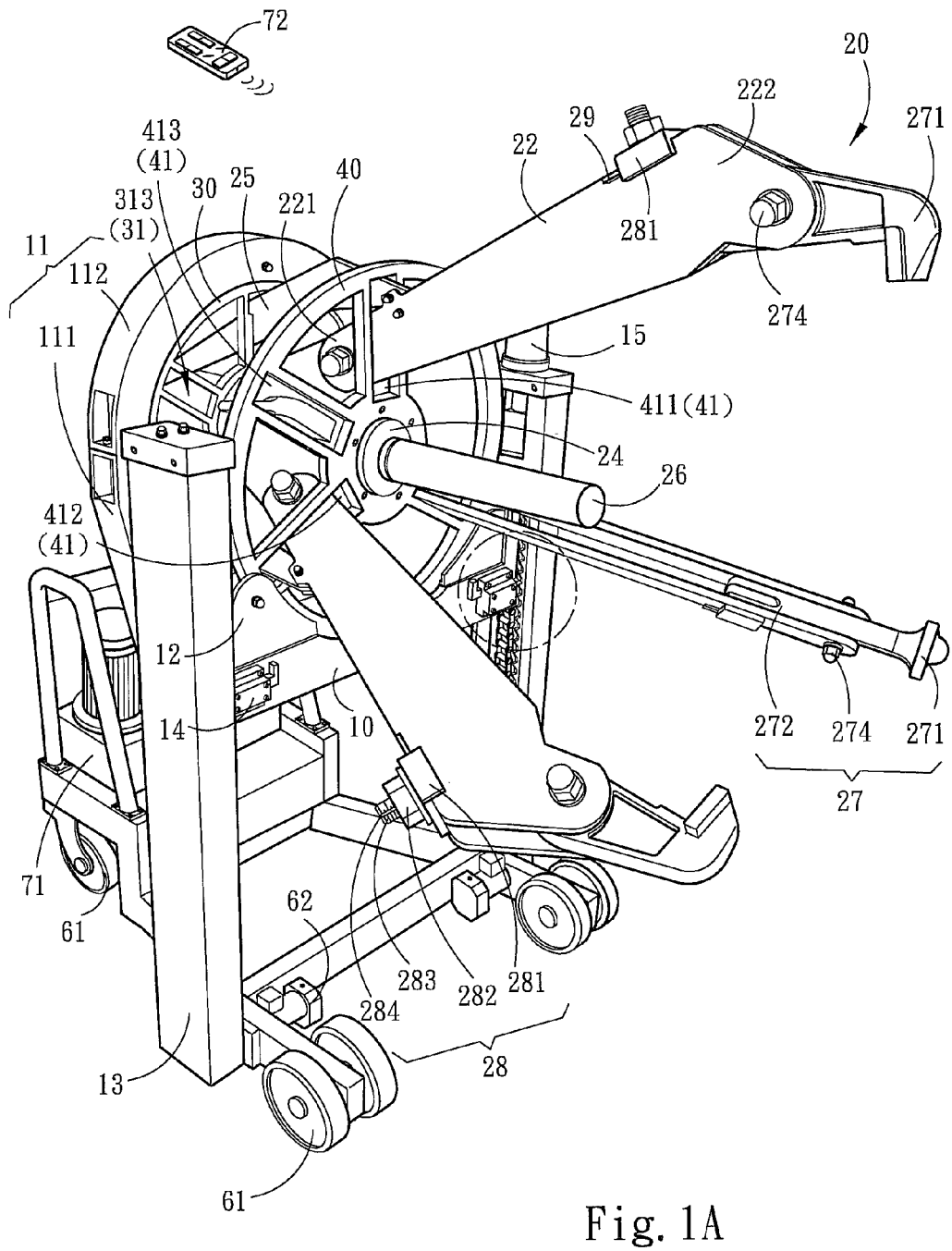
FIG. 1A is a perspective view of an embodiment of the invention.
Figure 1B:
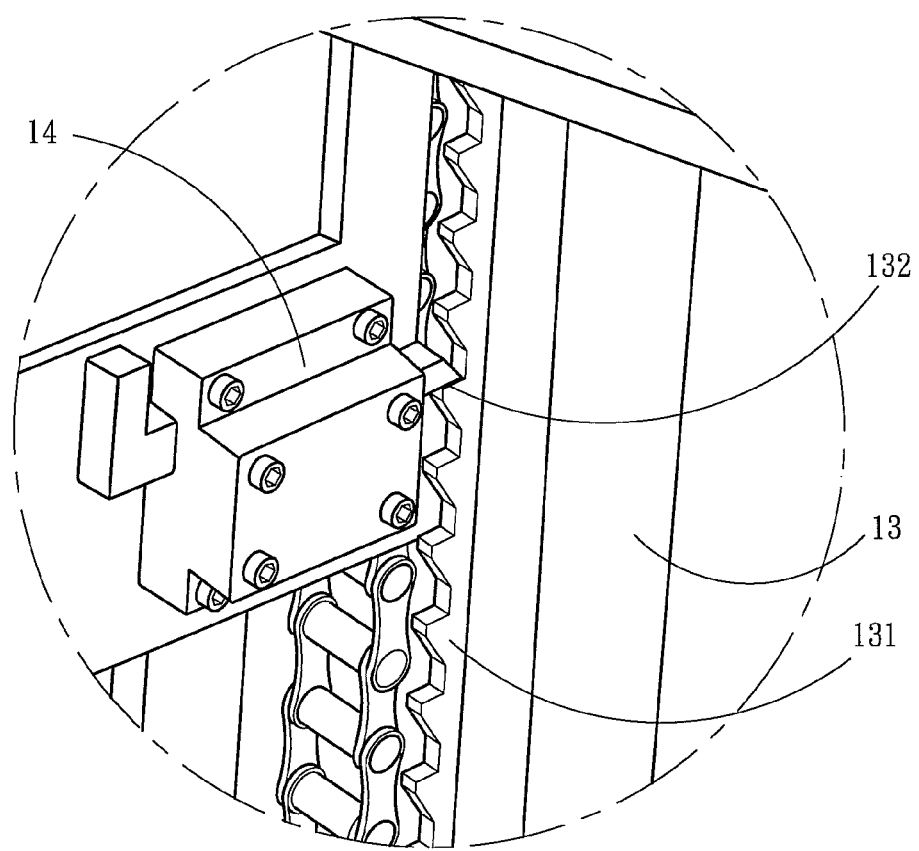
FIG. 1B is a fragmentary enlarged view of an embodiment of the invention.
Figure 2:
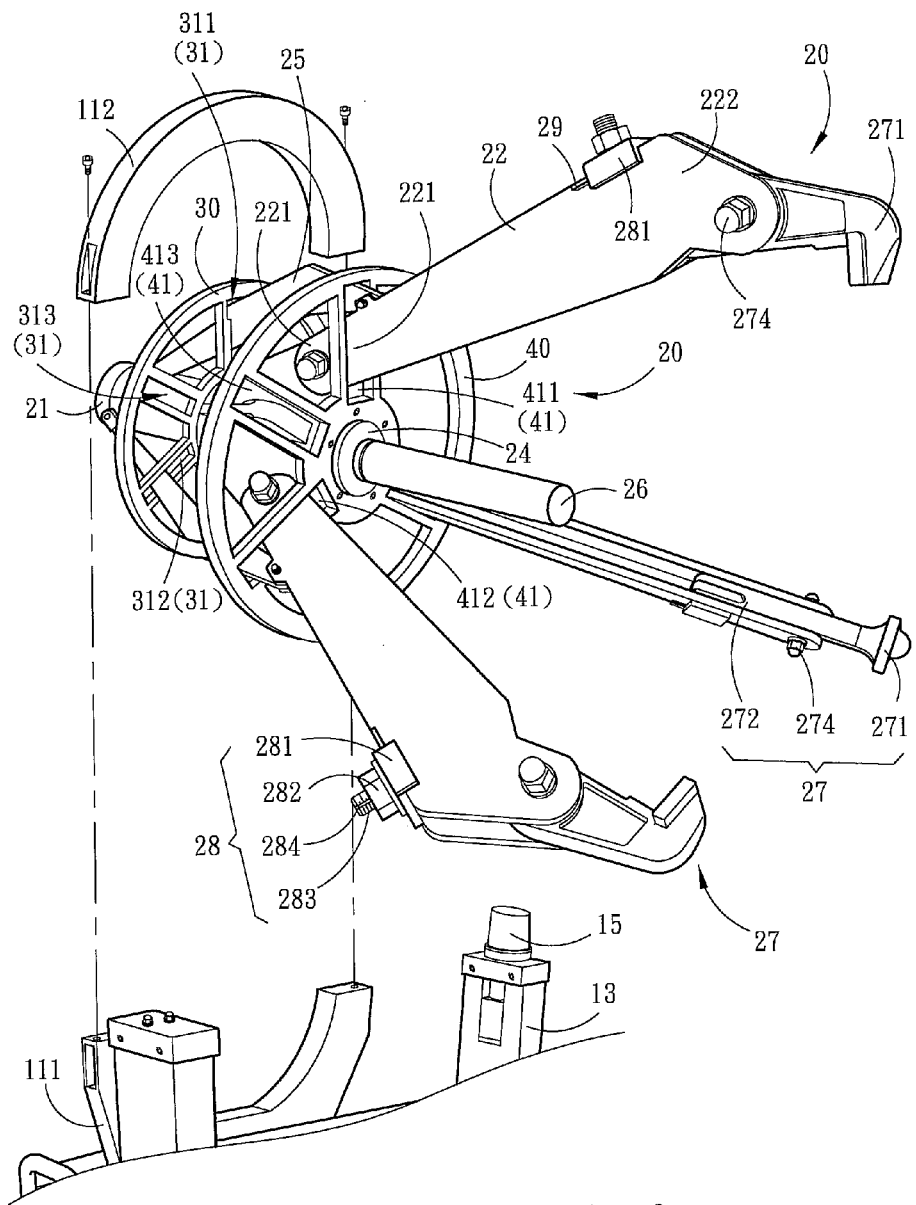
FIG. 2 is a fragmentary exploded view of an embodiment of the invention.

Please refer to FIGS. 1A, 1B and 2, the present invention aims to provide a liftable puller device that includes a holder 10, a puller assembly 20 located on the holder 10, a first frame 30 and a second frame 40. The holder 10 has a first holding portion 11 and a second holding portion 12. The puller assembly 20 has a main body 21, a plurality of grippers 22 hinged on the main body 21, a first hydraulic power system 23 (referring to FIG. 4A) and a second hydraulic power system 24 coaxially coupled with the main body 21, a plurality of telescopic members 25 hinged on the grippers 22 and first hydraulic power system 23, and a push rod 26 connecting to the second hydraulic power system 24. The first hydraulic power system 23 is axially moved to drive the grippers 22 to stretch or retract via the telescopic members 25. The second hydraulic power system 24 drives the push rod 26 to move axially to brace and butt a targeted wheel (not shown in the drawings) on which a wheel pulling operation is performed. The first holding portion 11 has a first assembly member 111 connecting to the holder 10 and a second assembly member 112 detachable from the first assembly member 111. The first assembly member 111 and second assembly 112 are coupled together to hold the first frame 30. In the event that the work station of the puller device is located at an elevation higher than the height adjustment range of the holder 10, the first assembly member 111 and second assembly member 112 can be separated to disengage the puller assembly 20 from the holder 10, and the puller assembly 20 is then hung on a suspension member (not shown in the drawings) to perform wheel pulling operation. Referring to FIG. 1B, the holder 10 further has a pair of pillars 13 at two sides coupling therewith. In the event that the work station for the puller device operation is higher than the height adjustment range of the holder 10, the pillars 13 can aid lifting and lowering of the holder 10 to allow the puller assembly 20 to perform wheel pulling operation. To enhance operation safety, each pillar 13 has a support member 131 with a plurality of detent portions 132 formed thereon. The holder 10 has a drop-prevention member 14 incorporating with the support member 131 and mating the detent portions 132 for positioning. After the drop-prevention member 14 has been lifted to a selected elevation and positioned on the detent portion 132, the lowering switch can be prevented from inadvertent touch, thereby is avoided the possibility of malfunction of the pillar 13 to improve safety. In addition, an alarm device 15 also can be installed on the pillar 13. During puller device operation a light is generated to alarm people in the neighborhood. To facilitate movement of the liftable puller device of the invention, the holder 10 is coupled with a plurality of wheels 61 and has a plurality of motors 62 connecting to the wheels 61, and a control module 71 connecting to the motors 62 and the puller assembly 20 to control operations of the motors 62 and puller assembly 20. In addition, a remote control unit 72 is provided connecting to the control unit 71 wirelessly to facilitate remote control outside a safety range to improve safety during operation.

The first frame 30 is connected to the main body 21 and holder 10, and includes a plurality of first retaining zones 31 run through by the telescopic members 25. The first retaining zones 31 include a first main retaining zone 311, two first sub retaining zones 312 and a first auxiliary retaining zone 313. The first main retaining zone 311 is located on a top end of the first frame 30. The two first sub retaining zones 312 are relative to and spaced from the first main retaining zone 311 at the same distance. The first auxiliary retaining zone 313 is located between the first main retaining zone 311 and one of the first sub retaining zones 312. The second frame 40 is connected to the main body 21 and second holding portion 12, and formed at a diameter greater than that of the first frame 30. The second frame 40 includes a plurality of second retaining zones 41 run through by the grippers 22. The second retaining zones 41 include a second main retaining zone 411, two second sub retaining zones 412 and a second auxiliary retaining zone 413 corresponding to the first retaining zones 31. In other words, the second main retaining zone 411 is located on a top end of the second frame 40, the second sub retaining zones 412 are relative to the second main retaining zone 411, and the second auxiliary retaining zone 413 is located between the second main retaining zone 411 and one of the second sub retaining zones 412.

Figure 3A:
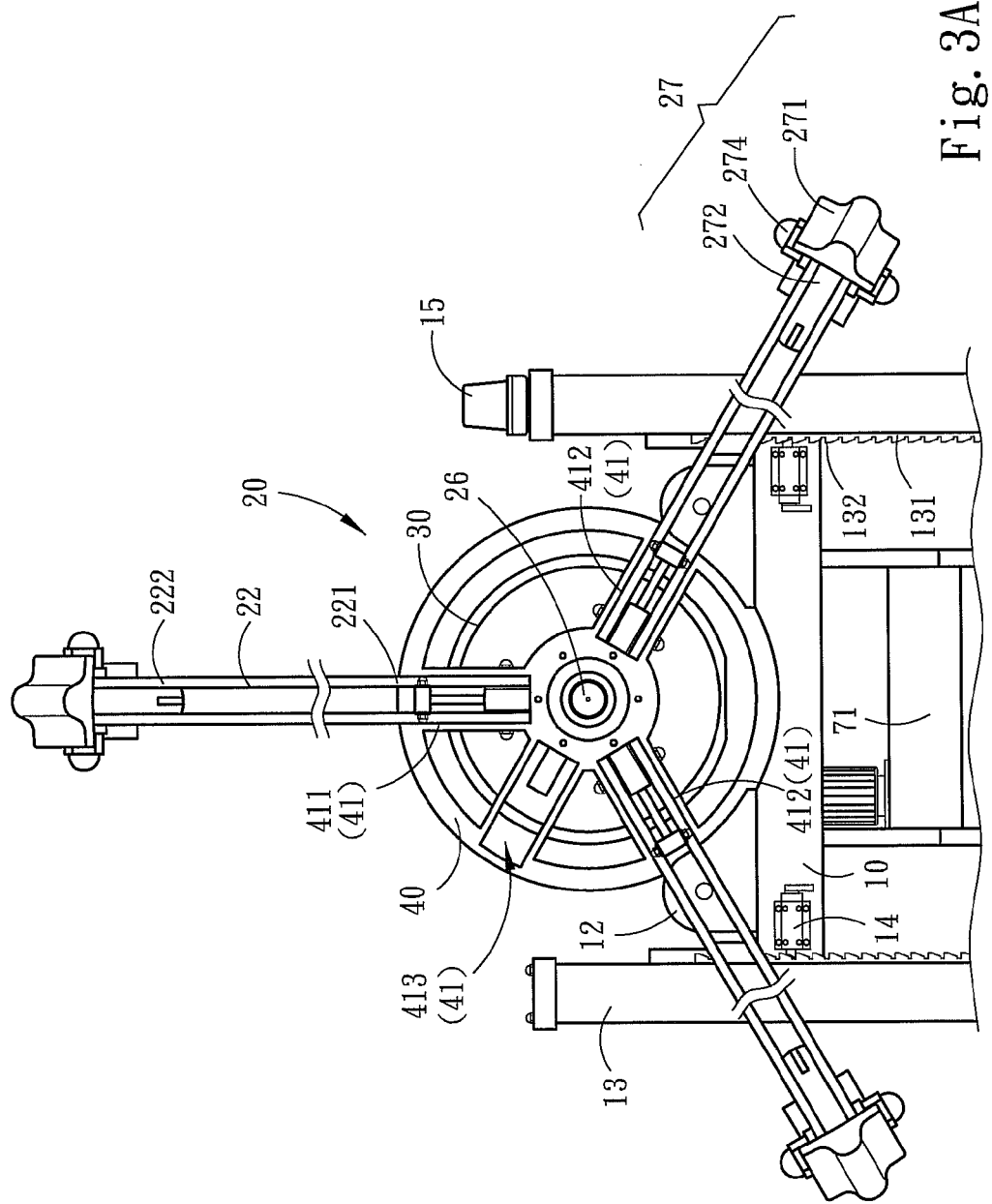
FIG. 3A is a schematic view of the invention showing a first gripping in a use condition.
Figure 3B:
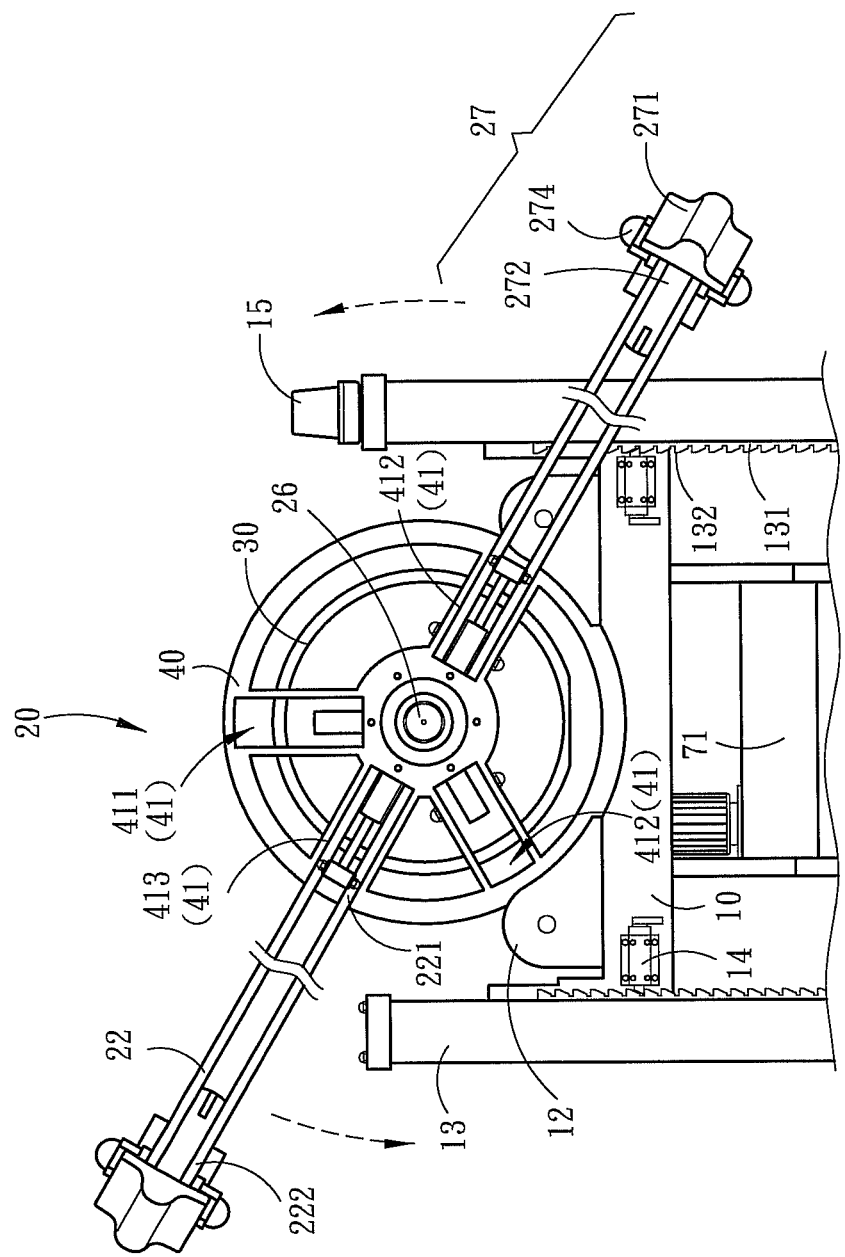
FIG. 3B is a schematic view of the invention showing a second gripping in a switched condition.
Figure 3C:
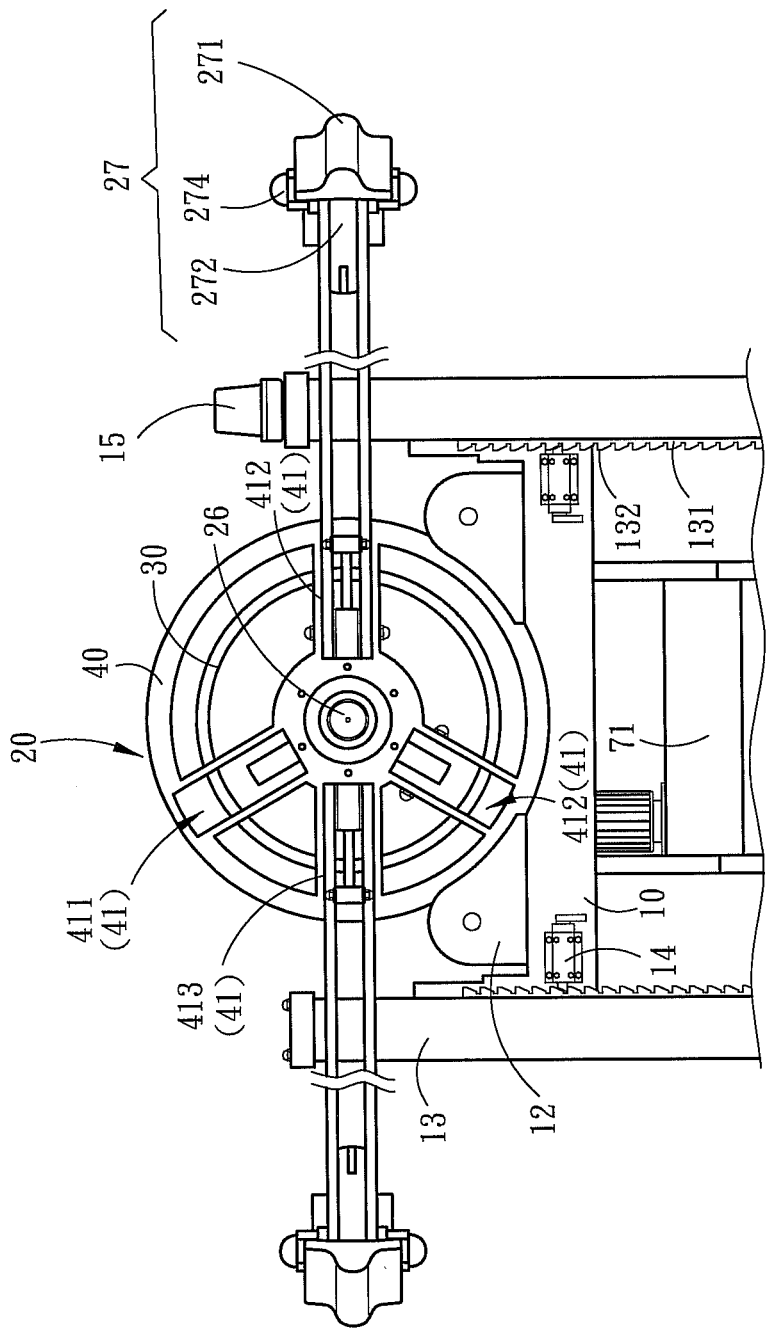
FIG. 3C is a schematic view of the invention showing a second gripping in a use condition.

Also referring to FIGS. 3A, 3B and 3C, the second main retaining zone 411 and the second sub retaining zones 412 are spaced from each other at an angle of 120° C. The second auxiliary retaining zone 413 and the second main retaining zone 411 are spaced from each other at an angle of 60° C. Hence the second auxiliary retaining zone 413 is opposite to one of the second sub retaining zones 412 at angle of 180° C. In a first gripping condition, the three grippers 22 are installed on the second main retaining zone 411 and second sub retaining zones 412 to form a three-gripper puller device structure to perform three-gripper wheel pulling operation. In the event that switching to a two-gripper puller device structure is desired, two grippers 22 are installed on the second auxiliary retaining zone 413 and one second sub retaining zone 412 corresponding to the second auxiliary retaining zone 413 as shown in FIG. 3B, thus switching of the two-gripper puller device can be accomplished. Referring to FIG. 3C, due to total weight of the device is great, switching between three-gripper and two-gripper at a minimum change can reduce switching difficulty. The invention provides the second auxiliary retaining zone 413 and first auxiliary retaining zone 313 as special design, by merely turning the grippers 22 counter-clockwise for 30° C., the two grippers 22 can be rotated to oppose to each other, therefore can perform wheel pulling operation by the two-gripper puller device in a limited space with constraints. Through the positional design of the second auxiliary retaining zone 413, the time for changing equipment can be saved, difficulty in changing operation can be reduced, and manpower can also be saved.

Figure 4A:
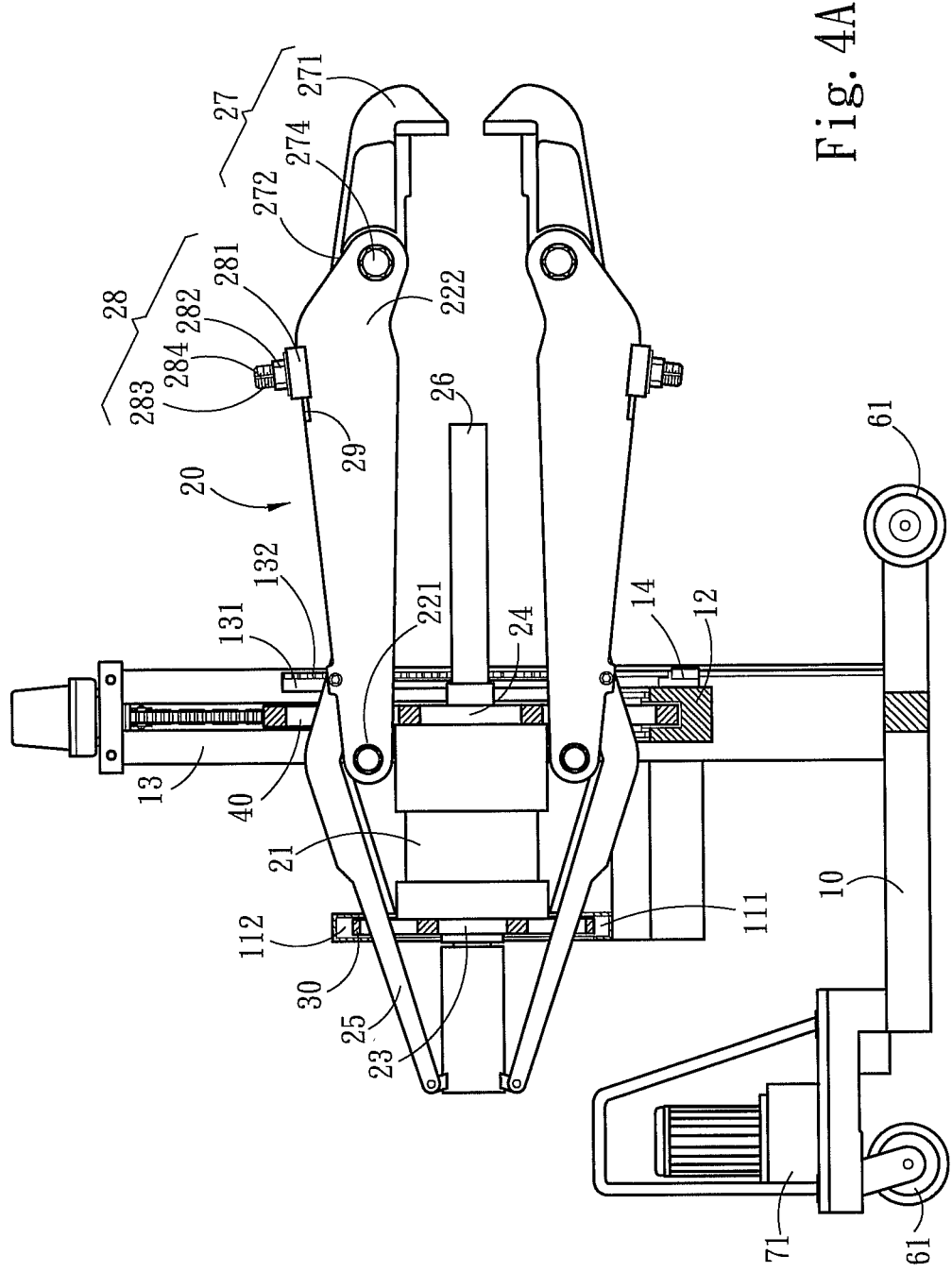
FIG. 4A is a schematic view of an embodiment of the invention showing the grippers in a retracting condition.
Figure 4B:
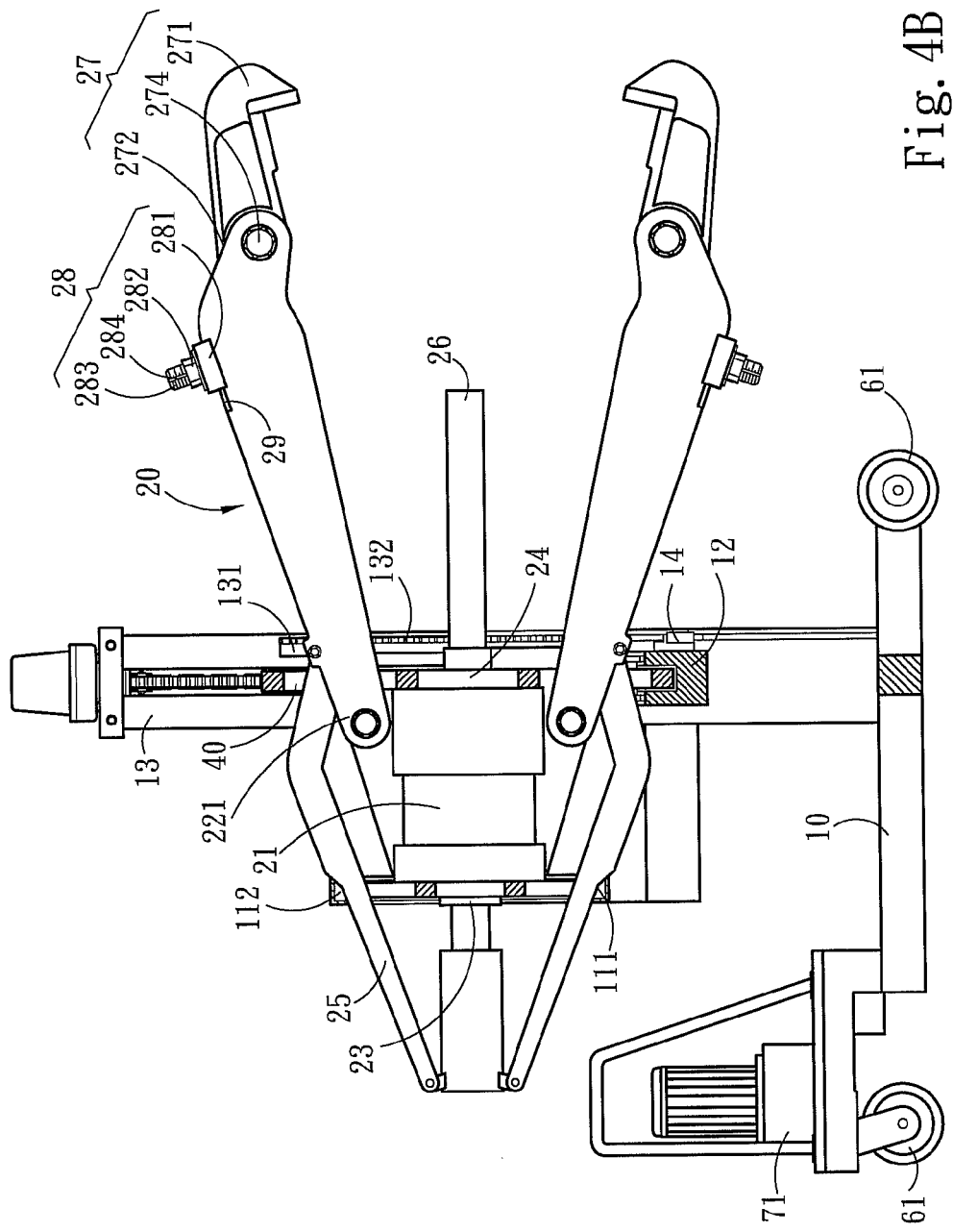
FIG. 4B is a schematic view of an embodiment of the invention showing the grippers in a stretching condition.
Figure 5B:
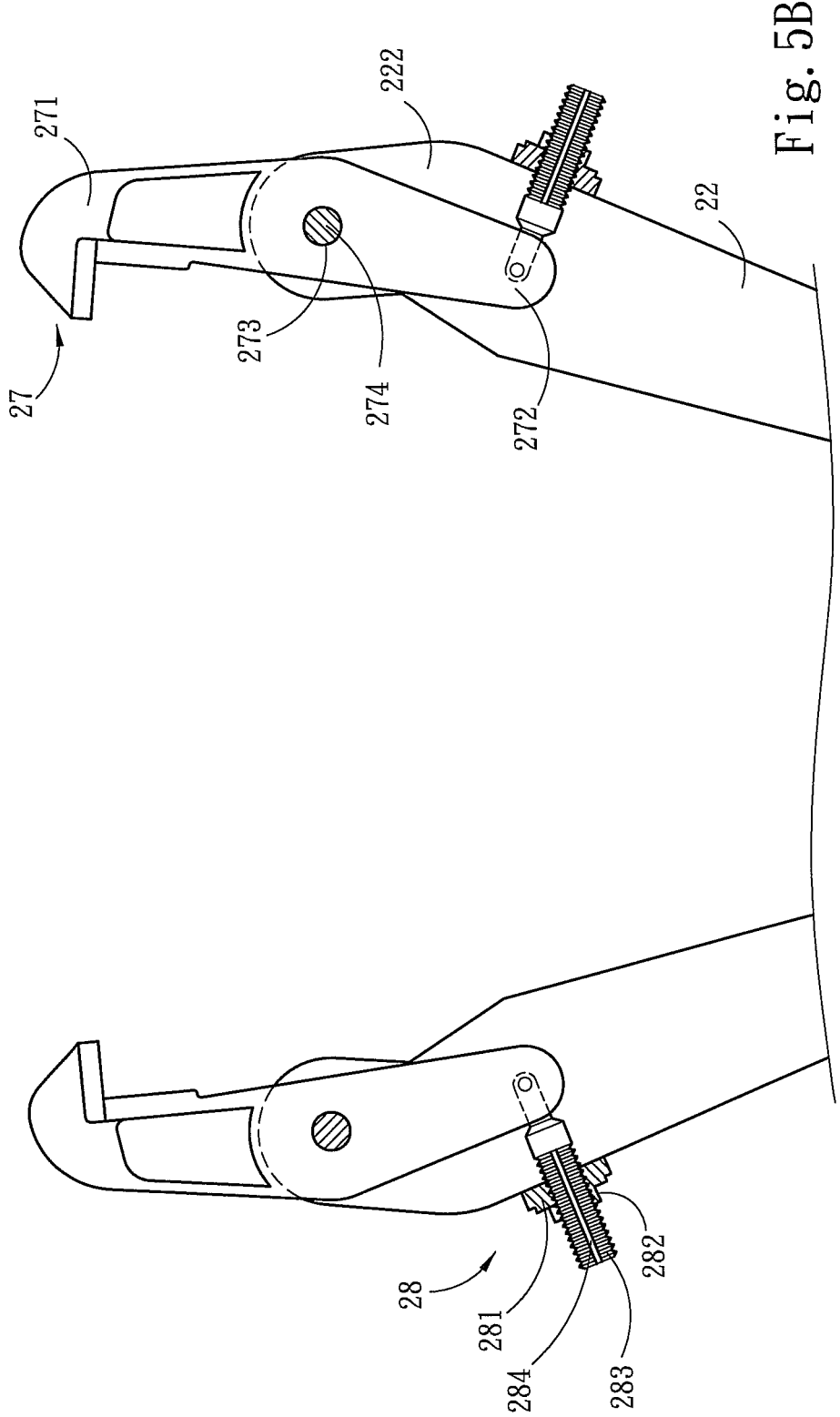
FIG. 5B is a schematic view of an embodiment of the invention showing angular adjustment condition-2 of the claw hook.

Referring to FIG. 4A, each gripper 22 has a first end 221 hinged on the main body 21 and a second end 222 relative to the first end 221. Each telescopic member 25 is hinged on the gripper 22 between the first end 221 and second end 222, and the second end 222 of the gripper 22 is coupled with a claw hook 27. The telescopic member 25 is driven by the axial movement of the first hydraulic power system 23 to pull the gripper 22. When the first hydraulic power system 23 moves axially towards the second hydraulic power system 24, the telescopic member 25 pushes the grippers 22 to retract. On the contrary, referring to FIG. 4B, when the first hydraulic power system 23 moves away axially from the second hydraulic power system 24, the telescopic member 25 pulls the grippers 22 about the first end 221 serving as a fulcrum to rotate to stretch the grippers 22. During wheel gripping operation, the second hydraulic power system 24 pushes the push rod 26 to move axially towards the claw hook 27, thereby the wheel is gripped by the claw hook 27 from two sides to perform wheel pulling operation. Referring to FIGS. 5A and 5B, the invention further provides an adjustment assembly 28 to couple with the claw hook 27 and gripper 22 to adjust the included angle between the claw hook 27 and gripper 22. The claw hook 27 has a hook 271 and a coupling portion 272 connecting to the adjustment assembly 28 at two ends thereof, and a through hole 273 between the hook 271 and coupling portion 272. The through hole 273 is run through by a pin 274 to hinge on the second end 222. The through hole 273 and pin 274 serve as a pivotal center of the hook 271. The adjustment assembly 28 includes an anchor seat 281 connecting to the gripper 22, a fastener 282 and a screw bar 283 hinged on the coupling portion 272 and running through the anchor seat 281 to fasten to the fastener 282. The screw bar 283 has a measurement scale 284 on the axial surface thereof. When the gripper 22 is stretched, the claw hook 27 incorporates with the angle of the gripper 22 to grip the targeted wheel that is desired for wheel pulling operation. Through collaboration of the fastener 282 and screw bar 283, the included angle between the claw hook 27 and gripper 22 can be controlled. The gripper 22 has a track 29 (referring to FIG. 1A) on the surface mating the anchor seat 281, so that when the fastener 282 is fastened to the screw bar 283, the adjustment assembly 28 can be moved slightly towards the second end 222 and the fastener 282 can be adjusted to a suitable position to fasten to the screw bar 283 at a vertical angle to prevent loosening. The measurement scale 284 provides a basis for precise angular measurement. By observing the position of the fastener 282 corresponding to the measurement scale 284, the included angle between the gripper 22 and claw hook 27 can be known.

As a conclusion, compared with the conventional techniques, the invention provides features as follows:

1. Through the first retaining zones 31 and second retaining zones 41, the grippers 22 can be switched between three-gripper and two-gripper structure as desired. Besides, with the first auxiliary retaining zone 313 located between the first main retaining zone 311 and one first sub retaining zone 312, switching between the three-gripper and two-gripper structure can be accomplished simply and quickly.

2. The first and second hydraulic power systems 23 and 24 are positioned coaxially, hence can reduce total size of the device, and also can provide a positive force and a reverse force coaxially during puller device operation to save power.

3. The pillars 13 are located at two sides of the holder 10 to provide desired and steady support for lifting and lowering operations. The drop-prevention member 14 can improve safety during operation.

4. The remote control unit 72 provides wireless remote control and can enhance operation safety.

5. With the measurement scale 284 formed on the surface of the screw bar 283, the angle between the gripper 22 and claw hook 27 can be precisely measured to facilitate operation and avoid angle discrepancy between various grippers 22 and their corresponding claw hooks 27.

All this shows that the present invention provides significant improvements over the conventional techniques.

What is claimed is:

1. A liftable puller device, comprising:
a holder including a first holding portion and a second holding portion;
a puller assembly which is located on the holder and includes a main body, a plurality of grippers hinged on the main body, a first hydraulic power system and a second hydraulic power system that are coaxially coupled with the main body, a plurality of telescopic members hinged on the plurality of grippers and the first hydraulic power system, and a push rod connecting to the second hydraulic power system; the first hydraulic power system being axially movable to drive the grippers to stretch or retract via the plurality of telescopic members, the second hydraulic power system driving the push rod to move axially;
a first frame which is coupled with the main body and the first holding portion and includes a plurality of first retaining zones run through by the telescopic members, the plurality of first retaining zones including a first main retaining zone, two first sub retaining zones and a first auxiliary retaining zone; the first main retaining zone being located on a top end of the first frame, the two first sub retaining zones being relative to the first main retaining zone, the first auxiliary retaining zone being located between the first main retaining zone and one of the two first sub retaining zones; and
a second frame which is connected to the main body and the second holding portion and formed at a diameter greater than that of the first frame and includes a plurality of second retaining zones run through by the grippers, the plurality of second retaining zones including a second main retaining zone, two second sub retaining zones and a second auxiliary retaining zone corresponding to the first retaining zones.

2. The liftable puller device of claim 1, wherein the first main retaining zone and the two first sub retaining zones are spaced from each other at 120° C. about the push rod serving as a circular center, the first auxiliary retaining zone and the first main retaining zone being spaced from each other at 60° C. about the push rod serving as a circular center.

3. The liftable puller device of claim 1, wherein the holder further includes a pair of pillars at two sides thereof and connecting therewith.

4. The liftable puller device of claim 3, wherein each of the pair of pillars includes a support member which includes a plurality of detent portions, the holder including a drop-prevention member incorporating with the support member and mating the plurality of detent portions for positioning.

5. The liftable puller device of claim 1, wherein the holder is coupled with a plurality of wheels for moving thereof and a plurality of motors connecting to the plurality of wheels.

6. The liftable puller device of claim 5 further including a control module connecting to the plurality of motors and the puller assembly.

7. The liftable puller device of claim 6 further including a remote control unit connecting wirelessly to the control module.

8. The liftable puller device of claim 1, wherein the first holding portion includes a first assembly member connecting to the holder and a second assembly member detachable from the first assembly member, the first assembly member and the second assembly member being coupled together to hold the first frame.

9. The liftable puller device of claim 1, wherein each of the grippers includes a first end hinged on the main body and a second end relative to the first end, each of the telescopic members being hinged between the first end and the second end of the gripper.

10. The liftable puller device of claim 9, wherein the second end of the gripper is coupled with a claw hook.

11. The liftable puller device of claim 10 further including an adjustment assembly to adjust an included angle between the claw hook and the gripper, the adjustment assembly being connected to the claw hook and the gripper, the claw hook including a hook and a coupling portion connecting to the adjustment assembly at two ends thereof, the claw hook including a through hole between the hook and the coupling portion run through by a pin to hinge on the second end of the gripper.

12. The liftable puller device of claim 11, wherein the adjustment assembly includes an anchor seat connecting to the gripper, a fastener and a screw bar hinged on the coupling portion and running through the anchor seat to fasten to the fastener, the screw bar including a measurement scale located axially on a surface thereof.

* * * * *